June 23, 1936.  E. NORTON  2,044,856
VALVE
Filed Oct. 10, 1932
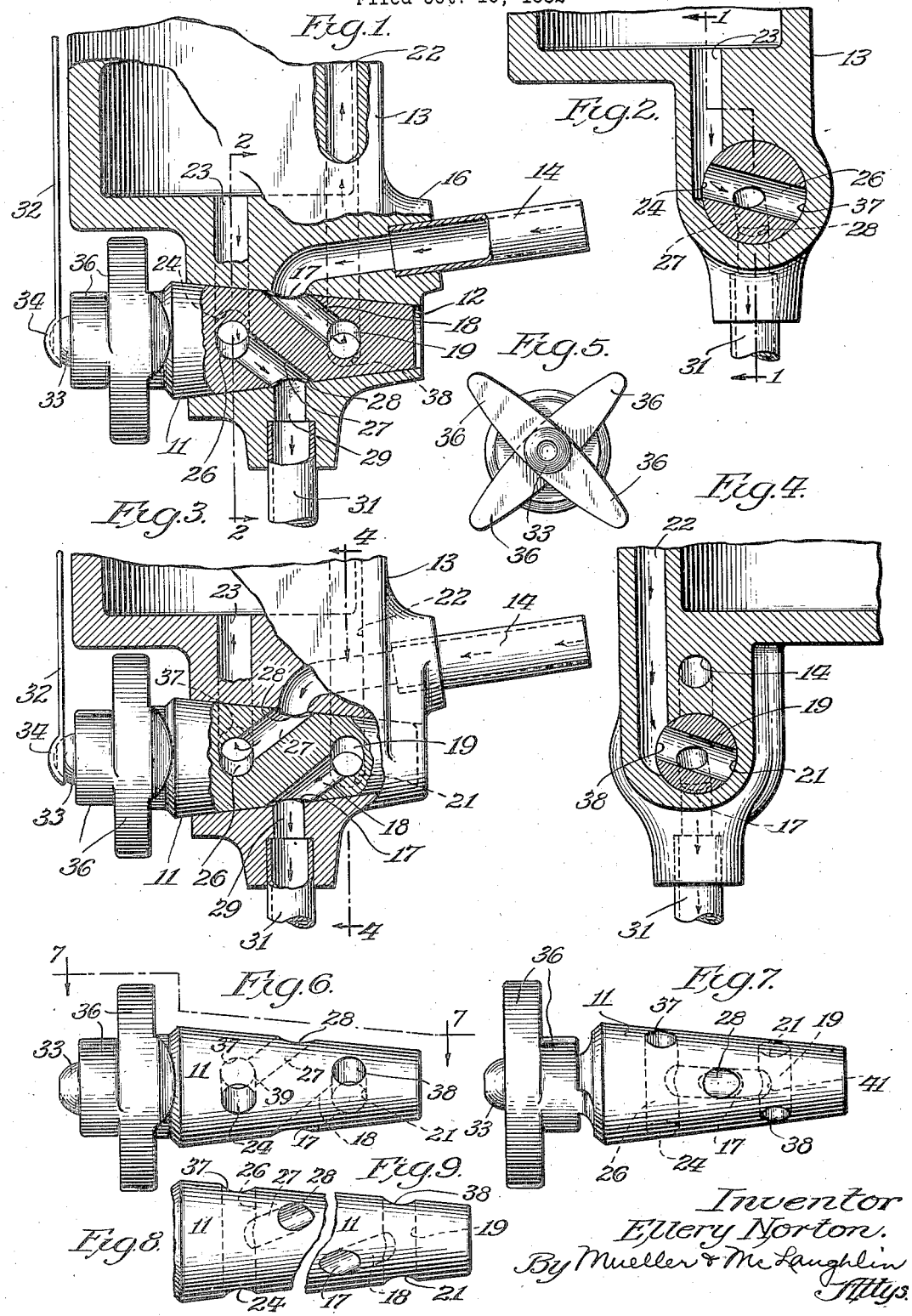
Inventor
Ellery Norton.
By Mueller & McLaughlin
Attys.

Patented June 23, 1936

2,044,856

UNITED STATES PATENT OFFICE 2,044,856

VALVE

Ellery Norton, Chicago, Ill.

Application October 10, 1932, Serial No. 637,040

8 Claims. (Cl. 251—104)

My invention relates in general to valves and in particular to a valve plug for use in connection with a machine adapted particularly for filling cans with condensed milk, oils, syrup, and many other liquids.

I will describe my valve as adapted to a can filling machine as shown in the Dickerson Patent No. 1,365,773. In this machine, it is essential that the measuring and filling cylinder used in connection therewith be first of all easily disassembled and cleaned for sanitary purposes and, secondly, that the measurement of the liquid with which the cans are filled be most accurate. It is, therefore, necessary that the valve used for opening and closing the cylinder be readily cleaned, and, to insure positive measurement, leak-proof. In the past, a valve plug has been used in which grooves are positioned on the surface so as to form channels connecting with the inlet and outlet tubes on the machine to fill and to discharge the cylinder. Inasmuch as the cans are filled rather rapidly and a very great number put through the machine each day, the valve plug turns in its seat in the valve chamber a great number of times and it has been found that due to the external channels or grooves on the surface of the valve—in effect void spaces—the valve wears unevenly to prevent a perfect seating in the valve chamber. Because of the comparatively small bearing surface in a valve plug of this construction, any such unevenness or a shoulder on the surface results in leakage. There is no way to machine down the valve to remove any irregularities in the surface thereof without decreasing the diameter progressively the length of the valve. This would result in a smaller valve whose grooves would no longer correspond with the openings to the inlet and outlet tubes on the machine.

It is an object of my invention to eliminate leakage in a valve; and

It is also an object to provide a valve plug with increased bearing surface in the valve chamber.

One of the features of my invention is the elimination of surface channels heretofore used for connecting the valve ports and providing internal passages thereby increasing the valve surface between ports and reducing leakage.

Other objects and advantages will appear as the description progresses.

Referring to the drawing, Fig. 1 is a fragmentary sectional view of a portion of a filling chamber as used on the machine made in accordance with the Dickerson patent, showing the valve in position for filling a can from the liquid in the lower portion of the cylinder;

Fig. 2 is a sectional view along the line 2—2 of Fig. 1;

Fig. 3 is a fragmentary sectional view of a filling cylinder with the valve plug in position in the valve chamber to permit the filling of the lower portion of the cylinder while the upper portion of the cylinder is discharging into a can;

Fig. 4 is a sectional view along the line 4—4 of Fig. 3;

Fig. 5 is an end view of the valve plug;

Fig. 6 is a front elevation of the valve plug;

Fig. 7 is the top plan view along the line 7—7 of Fig. 6;

Fig. 8 is a fragmentary view of one end of the valve plug; and

Fig. 9 is a fragmentary view of the other end of the valve plug.

In practicing my invention, I employ a valve, with a valve plug having internal ducts connecting inlet and outlet ports positioned on the outer surface of the plug to correspond to inlet and outlet tubes opening into a valve chamber to form separate internal passageways through the valve. Heretofore valve plugs have been used for this purpose which had external channels or passages extending longitudinally and circumferentially of the plug surface. This reduced the bearing surface of the plug seating in a valve chamber so that any slight unevenness or shoulder on the surface of the plug, and particularly between adjacent but separate passages, prevented a proper seating and leakage resulted. My valve is designed particularly to obviate this difficulty.

Referring now to the drawing, Fig. 1 illustrates a valve plug 11 seated in a valve chamber 12 integral with a cylinder 13 which has a piston therein operating in a vertical direction to divide the cylinder into two sections. This complete cylinder is not shown but the structure and operation may be noted by referring to the Dickerson patent above mentioned. To speed up the operation of filling cans with milk or other liquids, the machine is designed to fill one portion of the cylinder while the movement of the piston discharges the liquid which is standing in the other portion of the cylinder through the valve and into the can. In this operation, the evaporated milk or other liquid is passed through inlet tube 14 sealed in the lower portion 16 of the cylinder 13 with said inlet in alignment with port 17 connecting through longitudinal-angularly extending duct 18 to a forward transverse duct 19.

Duct 19, in the position shown in Fig. 1, has a port 21 in alignment with the opening in tube 22 extending vertically and opening into the upper portion of the cylinder (not shown). The liquid then follows the course of the arrows shown in the structure just described. At the same time, the lower portion of the cylinder which has previously been filled discharges its contents into the can by virtue of the position of the valve plug 11, wherein a passageway is formed from outlet tube 23 in the base of the cylinder through a port 24 in the plug into a rearward transverse duct 26 and out a longitudinal angularly extending duct 27 whose port 28 falls into alignment with the opening 29 in the outlet tube 31 extending vertically from the valve chamber to the can to be filled. The arrows in Fig. 1 indicate the path as described.

The valve plug 11 seats freely in the valve chamber 12, and is held therein by means of a spring 32 secured to the cylinder 13 in any suitable manner. This spring fits over the end 33 of the valve 11 by means of a concave portion 34 permitting rotary movement of the valve and at the same time exerting enough pressure longitudinally of the valve to hold it properly in seating engagement. The spring is pivoted so that it may be moved sidewise and away from the end 33 to allow the plug to be withdrawn.

The valve is rotated to the position shown in Fig. 3 by means of a suitable arm on the machine contacting an arm 36 on the handle of the valve. The rotation is predetermined in accordance with the operation of the entire can filling machine. In assuming the position shown in Fig. 3, the valve has been rotated through 180 degrees over that shown in Fig. 1 and in this position permits a filling of the lower chamber of the cylinder 13 through inlet tube 14, duct 27, which opens into the rearward transverse duct 26 and discharges the liquid according to the path of the arrows into tube 23. In this position, the port 37 corresponds to the opening in the tube 23. The port 37 is at the opposite side of the valve to the port 24 in the same transverse duct 26. Simultaneously, liquid is being forced out of the upper chamber of the cylinder by means of the action of the piston, into the tube 22, and following the path of the arrow through the opening in tube 22 and the corresponding port 38 in the forward transverse duct 19. The liquid then continues its passage through the valve plug 11, through duct 18, and out port 17, which is now in alignment with the opening 29 in the outlet tube 31.

Intermediate the positions of the valves illustrated in Figs. 1 and 3 and described above, the valve is in a position so that all ports are closed thereby stopping the flow of liquid both in and out of the cylinder. The can filling machine as a whole may be designed so that the filling and discharging operations are completed in four different steps with a 90° rotation of the valve plug for each step, so that all ports are closed in two positions of the valve.

The type of can filling machine for which the valve is particularly adapted finds its greatest application in filling cans with evaporated milk in quantities from 5 oz. on up, depending upon the particular commercial demand. It can thus be readily understood that each can is filled rather quickly and the valve will be rotated a great many times during the day in continuing this operation. The construction of the filling machinery necessitates an elongated valve so as to accommodate the plurality of ports and ducts, and in this elongated valve there must of necessity be a large surface seating in the chamber 12. The wear on this elongated and rather extensive surface is consequently great as will be readily noted on consulting Figs. 6 and 7. The more extensive the bearing surface on the valve plug, the less the probability that a slight unevenness or shoulder will so disrupt the seating of the plug as to cause a leakage in the valve. It is particularly important to prevent a leakage between a passageway through the valve acting as an inlet, for instance, while the other complete passageway is an outlet from the cylinder and liquid is being discharged into a can. A leak between ports 28 and 38 (Fig. 3) for instance would disturb the measurement of the liquid flowing into a can from outlet tube 31. The same would be true of a leak between ports 24 and 17. To obtain a maximum bearing surface between the above respective ports, I drill duct 27 longitudinally and angularly with respect to the axis of the plug 11, as shown in Fig. 8, so that it extends into duct 26 through opening 39 off-center with respect to the duct 26. Likewise duct 18 extends angularly into the plug to open into duct 19 through opening 41 off-center with respect to the latter duct. This construction is shown in Fig. 9, where a fragmentary front portion of the valve plug 11 is illustrated in a position wherein duct 19 extends vertically, and the valve has been rotated in a clockwise direction through approximately 225° from the position shown in Fig. 8. An outer port of a hole drilled into a conical surface in the plane of the axis but not at right angles to the axis itself would be elliptical in shape. However, by drilling the hole in the manner above described, the port becomes more circular and the area of the ellipse representing the port approaches the area of a circle with a diameter equal to the drilled hole. Thus, the surrounding bearing surface is increased and the distance between ports 28 and 38, and 24 and 17 is a maximum. With this construction, the valve plug 11 is capable of long, effective use, thus reducing the maintenance costs on the can filling machine, and in all providing a more satisfactory device.

Although I have described my valve as used in the can-filling machine illustrated in the Dickerson patent, it is understood that I do not limit myself thereto, but may adapt it to any similar device. It is further understood that the nature and embodiment of the invention herein described, is merely illustrative, and that many modifications may be made therein without departing from the spirit and scope of the invention.

What I claim as new and desire to protect by Letters Patent of the United States is:

1. In a valve plug, a plurality of separate internal passageways, each passageway comprising a transverse duct having port openings on the surface of said plug and a longitudinal angularly extending duct having a port opening on the surface of the plug and the other end opening into the transverse duct.

2. In a valve, a rotatable valve plug having two transverse ducts with surface ports, said plug having additional surface ports on opposite sides of the plug and axially spaced from the first surface ports with internal passageways interconnecting the transverse ducts and additional ports, whereby liquid may flow through each passageway in a different direction according to the rotary position of the plug.

3. A valve comprising a valve chamber having a valve plug seated therein, said valve plug comprising a plurality of transverse ducts having port openings on the outer surface thereof, a longitudinal angularly extending duct opening into each of said transverse ducts whereby separate passageways are formed internally of the valve, each longitudinal angularly extending duct having a port opening on the outer surface of the plug, and each passageway comprising a longitudinal angularly extending duct and a transverse duct.

4. A valve comprising a valve chamber, a rotatable valve plug seated therein, said chamber having four ports disposed on its seat, said valve plug having a pair of separate internal passageways, each comprising an interconnecting transverse duct and a longitudinal angularly extending duct terminating in port openings positioned to be in alignment with corresponding ports in said chamber whereby two complete separate passageways are provided through the valve.

5. A valve comprising a valve chamber having a seat with four ports disposed on said seat, one of said ports being solely an inlet port to the valve, and a second port solely an outlet port from the valve, a valve plug disposed in said chamber against said seat having a pair of separate internal passageways, each passageway comprising an inter-connecting transverse duct and a longitudinal angularly extending duct with a port opening from each duct onto the surface of the plug, with each longitudinal angularly extending duct positioned in a manner whereby the surface port of the same is adapted to selectively correspond with said inlet port and said outlet port, and the transverse ducts positioned in a manner whereby the surface port of one of said transverse ducts is adapted to correspond with one of the remaining two valve chamber ports, and the surface port of the other transverse duct is adapted to correspond with the other of the remaining two ports.

6. A valve comprising a valve chamber having a seat with four ports on the surface thereof, a valve plug rotatable in said seat having two separate similar passageways lying wholly within said valve plug, each passageway comprising a transverse duct and an interconnecting longitudinal angularly extending duct, with said passageways each positioned with respect to one another in a manner whereby each passageway will always be connected with two valve seat ports when the valve is in operative position.

7. A valve comprising a valve chamber having a seat, with a plurality of ports disposed on said seat, said ports including a single inlet port and a single outlet port, a rotatable valve plug disposed in said chamber against said seat and having a pair of separate similar passageways wholly within said plug, each passageway including a longitudinal angularly extending duct with a single surface port, with said duct positioned in the plug in a manner whereby the single surface port of the same will selectively correspond with the inlet port and outlet port in the valve chamber upon rotation of said plug, each passageway also including a transverse duct having a surface port for alinement with one of the other of said plurality of ports on the valve seat.

8. In a valve, a valve chamber having a seat, a valve plug rotatable in said valve seat having an internal passageway comprising a transverse duct having a surface port at each end and a single interconnecting longitudinal angularly extending duct opening out of said transverse duct at a point between its two surface ports and extending to a single surface port, with an inlet port, an outlet port, and a third port in said chamber seat for selective flow of liquids both in and out of the valve, depending upon the position of the valve plug, said seat ports disposed over the seat of said valve chamber, with said longitudinal angularly extending duct, when said valve is in operative position, opening into either said inlet port or said outlet port to connect through said transverse duct with said third port.

ELLERY NORTON.